United States Patent [19]

Kawashima

[11] Patent Number: 4,597,992

[45] Date of Patent: Jul. 1, 1986

[54] PROCESS FOR REGENERATING A MAN CONVEYOR HANDRAIL

[75] Inventor: Mikio Kawashima, Kashiwa, Japan

[73] Assignee: Hitachi Elevator Engineering & Service Co., Ltd., Tokyo, Japan

[21] Appl. No.: 688,550

[22] Filed: Jan. 3, 1985

[30] Foreign Application Priority Data

Sep. 11, 1984 [JP] Japan ............................ 59-188857

[51] Int. Cl.$^4$ ............................ B32B 35/00

[52] U.S. Cl. ............................ 427/140; 427/307; 427/290; 427/322

[58] Field of Search ............................ 427/140, 385.5, 307, 427/393.5, 322, 290; 252/52 R; 134/6, 16, 38, 40

[56] References Cited

U.S. PATENT DOCUMENTS 4,133,921 1/1979 Palcher ............................ 427/387 X
4,378,389 3/1983 Maruyama et al. ............................ 427/387

FOREIGN PATENT DOCUMENTS 53-126082 11/1978 Japan ............................ 427/290
0836324 6/1960 United Kingdom ............................ 427/387

*Primary Examiner*—Thurman K. Page
*Attorney, Agent, or Firm*—Oblon, Fisher, Spivak, McClelland & Maier

[57] ABSTRACT

The color and luster of a man conveyor handrail can be restored by mechanically grinding the surface of the handrail, degreasing the thus-ground surface of the handrail with a low-solubility solvent, and then coating a solution, which contains a room-temperature curable silicone resin containing methoxy groups and an organic solvent having a kauri-butanol value smaller than 100, onto the thus-degreased surface of the handrail. The process of this invention permits the operation of a man conveyor with handrails which always have a color and luster similar to fresh handrails without need for substantial increase to its running cost.

8 Claims, 2 Drawing Figures

PROCESS FOR REGENERATING A MAN CONVEYOR HANDRAIL

This invention relates to a process for regenerating a handrail of a man conveyor such as escalator, motor-driven road or the like, and more particularly to a process for regenerating with a high degree of gloss a handrail which has been used in actual operations and has hence been reduced in gloss.

Handrails for man conveyors such as escalators and motor-driven roads are used, as disclosed for example in Japanese Patent Laid-open No. 78983/1983, while being driven in pressure contact with rollers or the like so as to cause them to run not straight. To withstand such severe use conditions, they are each fabricated into a structure composed of a strength member and a surface material as shown for example in Japanese Patent Laid-open No. 56977/1980. Satisfactory service life is thus available owing to the inclusion of the strength material, while maintaining the necessary beautiful and attractive appearance by the surface material.

Since users directly touch such man conveyor handrails, it is desirable that such handrails have suitably beautiful and sufficiently clean and neat appearance. Accordingly, rubbers featuring coloring readiness such as that generally called "Hypalon" rubber (trade name of E. I. Du Pont de Nemours & Co., Inc.) are used as such surface materials. Mirror-finished surfaces are used during their molding stages to obtain desired color and gloss. By the way, the glossiness levels available in the above-mentioned manner are around 65° (as measured in accordance with the glossiness measuring method of the ASTM), although they vary depending on colors of handrails.

These handrails are used, for example, are driven in pressure contact with rollers as mentioned above, and their surfaces are frequently brought into contact with rollers and users' hands. Even if they have such high degrees of glossiness as mentioned above, their gloss will be reduced little by little during their use. Although the glossiness may vary depending on use conditions and environments, the glossiness will be reduced to 30° or lower when operated for 2 years, and generally to 10° or lower when 5–6 years are passed by.

Even a handrail, which has been reduced in gloss and has poor color and gloss as mentioned above, is accompanied by no special problem on its intended function. Therefore, it can still be used satisfactorily as is. However, a serious problem actually arises even by impairment to the beautiful appearance where special attention is paid to artistic aspects, for example, in department stores and the like. In these places, handrails have been replaced by fresh handrails only for reasons that their gloss were reduced.

However, these handrails are relatively expensive. If handrails are replaced by fresh handrails as mentioned above, the running cost of an escalator or the like will goes up significantly.

Therefore, under the above-mentioned situations, it has conventionally been practiced widely to restore their gloss with polishing agents. As polishing agents useful for such restoration of gloss, there have been used known waxes such as normal paraffin and carnauba wax, or polishing agents obtained by forming dimethyl silicone oil and water into emulsions.

Handrails having such reduced surface gloss as mentioned above have also been roughened in their surfaces. Even if a polishing agent is applied to them, it is not expectable to restore their surface gloss to any significant extents. Accordingly, the above polishing method cannot achieve any full restoration of the gloss. It is thus accompanied by such a drawback that its polishing effects last only for a short time period because the slightly and/or tentatively recovered surface gloss will be lost easily in such a short period of time as more and more of the polishing agent is transferred to users' hands.

In the meantime, a variety of special polishing agents have been proposed with a view toward obtaining polishing effects to sufficient degrees. For example, a polishing agent consisting principally of silicone and a mineral oil is proposed in Japanese Patent Laid-open No. 7862/1980, a wax obtained through copolymerization between a monoolefin and maleic anhydride in Japanese Patent Laid-open No. 58724/1980, and a wax containing an amino-modified silicone oil and dimethyl silicone oil as principal components in Japanese Patent Laid-open No. 62861/1981.

However, these polishing agents are still accompanied by the above-mentioned drawback when applied to such handrails, because the thus-restored gloss will be lost in a relatively short period of time and their effects will not last longer due to their transfer to users' hands.

On the other hand, it has also been known, apart from the above-mentioned methods which feature use of polishing agents, to grind the surface of a delustered handrail to a relatively great depth and then to coat a urethane resin over the thus-ground surface, followed by the curing of the urethane resin so that a fresh layer of the cured urethane resin is formed on the surface of the handrail to impart gloss to the handrail.

This method is however accompanied by another drawback that the newly-formed urethane resin layer is susceptible of developing cracks and may hence deteriorate the external appearance of the handrail due to such cracks.

In the above method, the covering of the urethane resin layer cannot be satisfactorily applied unless the surface of the handrail is ground to a relatively large thickness as mentioned above. Accordingly, a great deal of the surface material of the handrail is ground off upon its repair for the restoration of gloss. The above method is hence accompanied by a further drawback that it can hardly be applied repeatedly on the same handrail and the repair of the handrail by this method is generally feasible only once.

An object of this invention is therefore to overcome the above-mentioned drawbacks of the prior art methods and processes and to provide a process which when applied to a handrail which has lost its gloss and has been deteriorated in both color and luster, is capable of restoring its gloss to a satisfactory degree while making it possible to maintaining the thus-restored gloss over a long period of time without developing cracks in the gloss-restored surface.

In one aspect of this invention, there is accordingly provided a process for regenerating a man conveyor handrail, which process comprises at least the following steps:

mechanically grinding the surface of the handrail;

degreasing the thus-ground surface of the handrail with a low-solubility solvent; and coating a solution, which contains a room-temperature curable silicone resin containing methoxy groups and an organic solvent having a kauributanol value smaller than 100, onto the thus-degreased surface of the handrail.

The process of this invention permits the operation of a man conveyor with handrails which always have a color and luster similar to fresh handrails without need for substantial increase to its running cost.

The above and other objects, features and advantages of the present invention will become apparent from the following description and the appended claims, taken in conjunction with the accompanying drawings.

Figure 1:
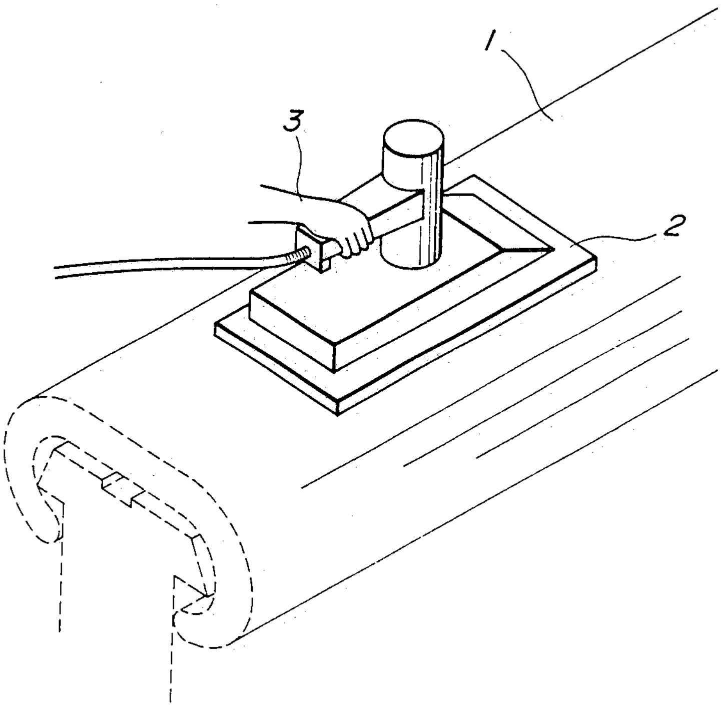
FIG. 1 is a schematic illustration of a grinding operation in the example of this invention.

The present inventors made, first of all, an investigation on carnauba wax, various oils and fats, polyethylene glycol, dimethyl silicone oil and so on, which have conventionally been employed as polishing agents. As a result, none of these conventional polishing agents were found to be satisfactory but among such polishing agents, dimethyl silicone oil was confirmed to have the greatest polishing effects. On the basis of this finding, the present inventors proceeded with a further investigation on silicone-type compounds. This additional investigation eventually resulted in a finding that a silicone, which can be cured at room temperature owing to its reaction with moisture present in the air, is capable of maintaining a high degree of gloss over a prolonged period of time without the danger of crack development because it is in a liquid state at the beginning but after the reaction, it will be converted to a plastic having high transparency and elasticity.

As solvents for such silicone resins, there have conventionally and generally been used organic solvents having relatively high kauri-butanol values of 100 and more and strong solubility, such as toluene and xylene. However, organic solvents having such strong solubility will dissolve the surfaces of handrails. It has also been found by the present inventors that the extents of dissolution of the surfaces of the handrails become significant where the kauri-butanol values exceed 100. The present invention thus employs, as solvent for such a silicone resin as mentioned above, an organic solvent having a kauri-butanol value smaller than 100 and capable of dissolving the silicone resin sufficiently. By the way, the term "kauri-butanol value" as used herein means an index adapted to indicate the relative dissolving power of a hydrocarbon-base solvent. In order to determine the kauri-butanol value of a solvent sample, the solvent sample is added little by little to 20 g of a standard solution containing kauri resin dissolved in n-butanol. Then, a precipitate (kauri resin) starts to appear in the standard solution. The volume of the solvent sample added until a predetermined degree of cloudiness appears in the standard solution is measured in terms of milliliters and is thereafter converted in accordance with a known calculating equation (see, the ASTM, D1334- 54T). A solvent is considered to have greater dissolving power as its kauri-butanol value increases.

Here, it is necessary to employ solvents, each of which has a kauri-butanol value smaller than 100 as mentioned above, as solvents for silicone resins to be coated on handrails. Among such solvents, fluorine-containing Freon(trade mark)-series solvents are particularly preferred. As one example of such Freon-series solvents, may be mentioned 1,1,2-trichloro-1,2,2-trifluoroethane. This solvent enjoys various advantages. Namely, it has a sufficiently low kauri-butanol value of 31 and is miscible with a silicone resin. Moreover, its surface tension is as low as about 19 dyne and thus shows good wettability. It also features a fast evaporation velocity (270, supposing that the evaporation velocity of $CCl_4$ be 100). Therefore, it requires short working time.

As silicone resins useful in the practice of this invention, it is essential for the reasons mentioned below that they contain methoxy groups as skeletal groups. Namely, such methoxy groups undergo hydrolysis due to moisture present in the atmosphere, followed by a methanol-removing reaction to form active —OH groups. These —OH groups then react to one another so as to crosslink the silicone resins, leading to the formation of plastics having elasticity. On the other hand, alkyl groups and phenyl groups are also necessary as other groups bonded to silicon atoms. As such alkyl groups, may be mentioned methyl and ethyl groups.

By the way, the essential feature of this invention resides in the coating of the above-mentioned silicone resin. In many instances, it is however generally difficult to actually restore the gloss of a handrail sufficiently even if a solution, which has been prepared by dissolving such a silicone resin in an organic solvent having a kauri-butanol value smaller than 100, is coated as is on the handrail. A silicone resin solution of this invention was coated by a hand sprayer onto a hand rail the surface gloss of which has been reduced to 10°-15° or so as a result of its actual use on an escalator. It was possible to restore the gloss of the handrail to a relatively high degree. However, the surface gloss varied considerably from 25°-50°. Namely, the coating was extremely uneven.

The present inventors then made a still further investigation to find out causes for such uneven coating. Such uneven coating was found to occur for the following reasons. Namely, the surface of such a handrail became rough. When coated, more silicone resin entered dents and the like in the surface of the handrail and the thickness of the thus-coated film became uneven. On the basis of a still further investigation, the present inventors decided to incorporate a water-grinding step which makes use of waterproof grinding paper. Namely, waterproof grinding paper having a grain size finer than #800 described in R6253 of the Japanese Industrial Standard was selected. It was then attached to an orbital sander. The handrail was ground by the orbital sander while feeding water to the surface of the handrail. Thereafter, subsequent to degreasing the thus-ground surface with a low-solubility solvent, the above-described silicone resin solution was coated by a hand sprayer. The surface of the handrail then showed an extremely high degree of gloss. No coating non-uniformity was observed at all.

By the way, the extent of grinding required for the above process was found to be as small as about 0.1 mm in terms of thickness. The water grinding was adopted to avoid imminent deleterious effects which will be given to the surface of each handrail by frictional heat to be generated owing to the additional incorporation of the grinding step. The adoption of such water grinding is effective in controlling temperature increases of the surface of the handrail within 2°-3° C. during its grinding step even if such temperature increases take place.

EXAMPLE

One example of the regenerating method of this invention for a man conveyor handrail will hereinafter be described.

There was provided a black handrail the gloss of which has dropped from its initial gloss of 65° to a gloss of 3°-5° during its actual use over 7 years on an escalator.

Since severe stain, soil and the like, such as chewed gum wastes, were observed on the handrail, waterproof grinding paper of #240 (as defined in R6253 of the Japanese Industrial Standard) was attached to such an orbital sander as depicted in FIG. 1 and the surface of the hand rail was then ground while applying water thereto. Incidentally, FIG. 1 illustrates the handrail 1, orbital sander 2 and a worker's hand 3.

By using relatively rough grinding paper of #240 or so at the beginning as mentioned above, stain, soil and the like can be readily removed from the surfaces of handrails.

Since the surface stain, soil and the like were successfully removed in the above manner, waterproof grinding paper of #800 (as defined in R6253 of the Japanese Industrial Standard) was attached to the orbital sander and the surface of the handrail was ground by the orbital sander while also applying water thereto.

The grinding work with the waterproof grinding paper of #800 was continued until the grinding marks, which had been left by the grinding paper of #240, were removed completely. Then, the surface of the handrail was wiped thoroughly with rag or the like to wipe off rubber chips or crumblings and the like completely, forming a ground surface on the handrail.

Using a hand sprayer, a liquid mixture consisting of 1,1,2-trichloro-1,2,2-trifluoroethane and ethyl alcohol, a low-solubility solvent, were then sprayed onto the thus-ground surface of the handrail. Thereafter, the surface of the handrail was wiped off with dry rag to degrease and dry the surface, thereby converting the surface of the handrail into a degreased surface.

There was next provided a solution which contained a methoxy-containing silicone resin dissolved in 1,1,2-trichloro-1,2,2-trifluoroethane and represented by the following formula:

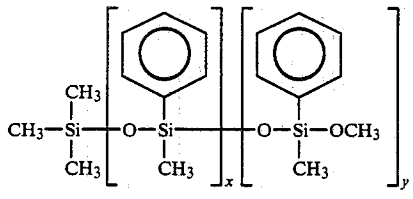

wherein $1 \leqq x+y \leqq 20{,}000$, $1 \leqq y \leqq 20{,}000$ and $0 \leqq x \leqq 19{,}999$. The solution was poured in a hand sprayer and was then coated evenly on the degreased surfaces of the hand rail.

Then, the thus-applied coating was allowed to dry to finger-touch dryness, e.g., for about 30 minutes when the temperature was 20° C., thereby completing the series of regenerating treatments for the handrail surface.

In the case of such an escalator handrail or the like, a part of its surface (approximately one half of its whole surface) is generally exposed when it is actually mounted on the escalator. Accordingly, the above-described series of regenerating operations cannot be applied at once to the entire length of the handrail. The escalator is driven subsequent to the series of regenerating operations until the handrail is caused to move over a predetermined length so as to expose an untreated portion of the handrail surface. These operations have to be repeated.

Turning to the resulting handrail which had gotten through with the above regenerating treatments, the gloss of the thus-treated surface was measured at desired 50 spots. As a result, measurement values of 55°-60° were obtained at all the spots. Therefore, it was possible to obtain substantially the same gloss as that the handrail had when it was new.

The thus-regenerated handrail was mounted on the escalator and was then used for 3 months. Thereafter, its gloss was measured at desired 50 spots in the same manner. The gloss ranged from 53° to 60°. It was therefore found that no practical reduction occurred to the gloss during such a short period of time. Needless to say, cracks were not developed at all.

In Table 1, a comparison between gloss obtained upon application of the present invention and that achieved when a polishing agent consisting principally of dimethyl silicone oil, the most effective polishing agent among conventional polishing agents, was applied is tabulated, including their variations along the passage of time. On the basis of this comparison, it will be immediately understood how much the present invention is effective.

Table 2 shows results of some application examples of the present invention. It is clearly envisaged that in each of the application examples, regenerating effects have been satisfactorily achieved.

TABLE 1

| | (Measured at 50 Spots) | | | | |
|---|---|---|---|---|---|
| | Gloss before coating | Gloss right after coating | Gloss 2 weeks later | Gloss 12 weeks later | Gloss 24 weeks later |
| Polishing agent (Dimethyl silicone oil) | 3°-5° | 16°-22° | 4°-5° | 3°-5° | 3°-5° |
| Invention process | 3°-5° | 55°-60° | 55°-60° | 53°-60° | 47°-54° |

TABLE 2

| | | | (Measured at 30 Spots) | | | |
|---|---|---|---|---|---|---|
| Run # | Years in use | Color of handrail | Gloss before coating | Gloss right after coating | Gloss 12 weeks later | Occurrence of cracks |
| 1 | 3 | light brown | 18°-25° | 60°-70° | 55°-62° | none |
| 2 | 5 | blue | 6°-8° | 60°-66° | 52°-58° | none |
| 3 | 5 | red | 6°-8° | 56°-60° | 50°-55° | none |
| 4 | 7 | black | 11°-18° | 55°-60° | 46°-52° | none |
| 5 | 12 | red | 3°-4° | 45°-50° | 40°-43° | none |

TABLE 2-continued

| | | | (Measured at 30 Spots) | | | |
|---|---|---|---|---|---|---|
| Run # | Years in use | Color of handrail | Gloss before coating | Gloss right after coating | Gloss 12 weeks later | Occurrence of cracks |
| 6 | 6 | dark blue | 3°-5° | 53°-58° | 46°-50° | none |
| 7 | 7 | rouge | 6°-8° | 55°-62° | 48°-53° | none |

By the way, it has been known that the reactions of the silicone resins, which are useful in the practice of this invention, are affected by temperature.

Figure 2:
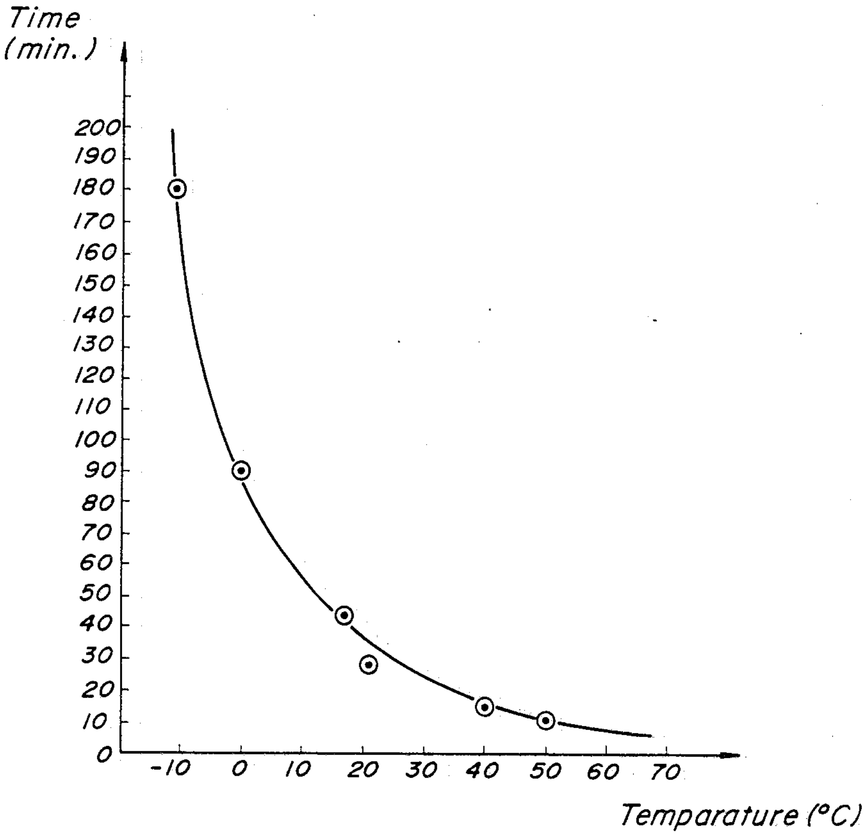
FIG. 2 is a characteristic diagram showing the relationship between the time required for finger-touch dryness and the temperature in the example of this invention.

For example, the relationship between the time required for finger-touch dryness, when a silicon resin of this invention is dissolved in a solvent consisting of 1,1,2-trichloro-1,2,2-trifluoroethane as in the above Example, and the temperature is shown in FIG. 2.

In the above Example, the time required for finger-touch dryness thus becomes longer as the temperature of the working environment goes down. This means that at lower temperatures, the regenerating work takes more time and may thus become disadvantageous from the viewpoint of cost or the like.

The above problem may however be overcome by using, as the solvent for dissolving the silicone resin, isopropyl alcohol mixed with several percent of water in place of 1,1,2-trichloro-1,2,2-trifluoroethane used in the above Example when the temperature of the working environment is for example below 10° C. Use of such water-mixed isopropyl alcohol makes it possible to reduce the time required for finger-touch dryness to one third or even shorter when the temperature is 10° C., whereby wiping out the need for longer working time.

As reasons for the shorter time period achieved for finger-touch dryness at such a low temperature by the use the water-mixed isopropyl alcohol as the solvent, it may be mentioned that the above reaction of the silicone resin is a hydrolytic reaction and can thus proceed more readily depending directly on the water present in the solution instead of relying upon the moisture in the air. Although it has not been fully proven whether the velocity controlling step of the above reaction is composed in its entirety of a hydrolytic reaction or not, the use of such water-mixed isopropyl alcohol unables to obtain a reaction velocity as fast as three times compared with that available from the use of 1,1,2-trichloro-1,2,2-trifluoroethane when the temperature is 10° C. Accordingly, such water-mixed isopropyl alcohol allows to conduct efficient regenerating work at low temperatures.

On the other hand, such water-mixed isopropyl alcohol will render the reaction too fast and will thus be conversely difficult to use when the temperature is above 20° C., since its use can achieve a sufficient reaction velocity even at low temperatures as described above.

Therefore, it is generally more recommendable and more practical to use the above-described 1,1,2-trichloro-1,2,2-trifluoroethane for better work efficiency.

Although the kauri-butanol value of the above-described water-mixed isopropyl alcohol has not yet been measured, no abnormality was observed on the surface of the handrail in each run of the Example of this invention, in which run the water-mixed isopropyl alcohol was employed. Therefore, it is clear that this water-mixed isopropyl alcohol is also one of the organic solvents having kauri-butanol values smaller than 100.

In view of the above-obtained results, it may be contemplated to incorporate water in 1,1,2-trichloro-1,2,2-trifluoroethane with a view toward increasing the reaction velocity at low temperatures. However, this solvent is not miscible with water and the incorporation of water is not feasible.

Several solvents may be contemplated in lieu of the above-described isopropyl alcohol. Water was mixed by way of example in methyl alcohol and ethyl alcohol respectively. However, the reaction velocity was not increased so much as that achieved from the use of isopropyl alcohol. Namely, such water-mixed methyl alcohol and water-mixed ethyl alcohol were able to increase the reaction velocity by 1.5-2 times at most. Thus, no substantial practical effects can be expected. From these results, it is suggested that the reaction of each silicone resin will be affected considerably by a solvent to be used together with the silicone resin.

Having now fully described the invention, it will be apparent to one or ordinary skill in the art that many changes and modifications can be made thereto without departing from the spirit or scope of the invention as set forth herein.

I claim:

1. A process for regenerating a man conveyor handrail, which process comprises the following steps:
   - grinding the surface of the handrail with a fine waterproof abrasive paper in the presence of water to finish the surface into a smooth and ground surface;
   - degreasing the thus-ground smooth surface of the handrail with a low-solubility solvent; and
   - coating a solution, which contains a room-temperature curable silicone resin containing methoxy groups and an organic solvent having a kauri-butanol value smaller than 100, onto the thus-degreased surfaces of the handrail.

2. A process according to claim 1, wherein the surface of the handrail is made of a rubber which has been obtained by chlorinating and sulfonating polyethylene.

3. A process according to claim 1, wherein the organic solvent is a mixed solvent of isopropyl alcohol and water.

4. A process according to claim 1, wherein the final grain size of the waterproof abrasive paper is finer than #800 defined in the Japanese Industrial Standard, R6253.

5. A process according to claim 1, wherein the water grinding step is carried out by an orbital sander.

6. A process according to claim 1, wherein the low-solubility solvent is a mixed solvent of 1,1,2-trichloro-1,2,2-trifluoroethane and ethyl alcohol.

7. A process according to claim 1, wherein the room-temperature curable silicone resin is represented by the following general formula:

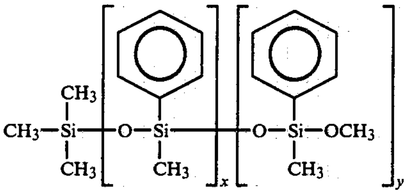
wherein $1 \leqq x+y \leqq 20{,}000$, $1 \leqq y \leqq 20{,}000$ and $0 \leqq x \leqq 19{,}999$.
8. A process according to claim 1, wherein the organic solvent is 1,1,2-trichloro-1,2,2-trifluoroethane.
* * * * *
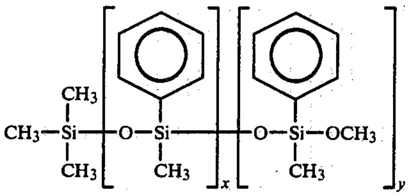
wherein $1 \leqq x+y \leqq 20{,}000$, $1 \leqq y \leqq 20{,}000$ and $0 \leqq x \leqq 19{,}999$.
8. A process according to claim 1, wherein the organic solvent is 1,1,2-trichloro-1,2,2-trifluoroethane.
* * * * *